GENERATOR OF AN AEROSOL OF POWDER PARTICLES

Filed Feb. 18, 1955 3 Sheets-Sheet 1

INVENTOR.
JERRY L. STOCKDALE
CARL L. MEYER
BY
Frank A Steinhilper
ATTORNEY

*INVENTOR.*
JERRY L. STOCKDALE
CARL L. MEYER
*BY*
Frank A. Steinhilper
ATTORNEY

INVENTOR.
JERRY L. STOCKDALE
CARL L. MEYER
BY
Frank A. Steinhilper
ATTORNEY

United States Patent Office 2,832,511

Patented Apr. 29, 1958

2,832,511

GENERATOR OF AN AEROSOL OF POWDER PARTICLES

Jerry L. Stockdale and Carl L. Meyer, Columbus, Ohio, assignors, by mesne assignments, to The Haloid Company, Rochester, N. Y., a corporation of New York Application February 18, 1955, Serial No. 489,253

3 Claims. (Cl. 222—193)

This invention relates in general to xerography and in particular to development of electrostatic charge patterns.

In xerography an image pattern of electric charges is formed on a xerographic plate by exposing a sensitive plate to a light image or light pattern. A surface of the plate is composed of a photoconductive material that reacts to light by changing its electrical resistance characteristics. The plate is made sensitive by placing on this surface, which is electrically insulating in darkness, a uniform electrostatic charge. The sensitive plate, when exposed to a light pattern, dissipates charges where light strikes the plate. Dissipation of charge results due to an increase in conductivity of areas of the plate struck by light. Insulating characteristics of the plate are not affected where no light reaches the plate surface, and these areas continue to hold electrostatic charges. Exposing then, to a light pattern, results in substantially complete discharge in areas where light strikes, but no discharge where no light strikes. Areas projected to the surface of a sensitive xerographic plate which are between the extremes of no light and intense or full light result in proportional reductions of electrostatic charge on the photosensitive surface of the plate. The resultant pattern of electric charges following exposure of the sensitive plate to a projected light image is one where substantially no charges exist where full light was projected to the surface, original charges continue to exist where no light reached the surface, and charges in inverse proportion to the amount of light reaching the plate remain in areas struck by intermediate quantities of light. This electric charge pattern, which is generally termed in xerography an electrostatic latent image, may be transferred to another surface or allowed to remain on the plate and may then be developed by bringing into the area of influence of the charge pattern electrostatically charged powder particles. Development is the deposition of powder particles on a surface carrying an electric charge pattern in image configuration which is controlled and attained through the electrostatic charge pattern.

It is an object of this invention to improve upon means and methods for the development of electrostatic latent images.

It is also an object of this invention to improve upon apparatus for the development of electrostatic latent images.

One technique for developing an electrostatic latent image is described in Walkup U. S. Patent 2,618,551, and is known as cascade development. In this form of development, developer particles are caused to adhere to carrier particles through the use of electrostatic forces. These combined particles are cascaded across the surface of a plate carrying an electrostatic latent image, and developer particles are deposited on the plate in image configuration due to the greater effect of electrostatic forces exerted on the developer particles by the electrostatic latent image over the forces existing between the carriers and the developer particles.

Another form of development of electrostatic latent images is known as powder cloud development, which involves forming a cloud of electrostatically charged powder particles suspended in air or other gas and supplying this charged powder cloud to the area of influence of the electrostatic latent image. This form of development is disclosed and described in Carlson U. S. Patent 2,221,776 wherein a rotating vane wheel or propeller is used to stir up powder in a chamber thereby creating a cloud for presentation to the electrostatic image. The vane or propeller in that patent may be connected to a terminal of a battery to impart charge to the powder particles.

Generally in powder cloud creating apparatus, there is included a powder source, means to create a cloud of powder in gas, means to convey the cloud to a plate carrying an electrostatic latent image, and means to electrostatically charge the powder in the cloud before it reaches the plate. Such devices, which include one or a number of the above elements and which are used to take powder from a source whether it be a mound of powder or whether it be in other shapes or forms and convert it to an aerosol of powder in gas, is herein and generally in the art referred to as a "cloud generator."

It is an object of this invention to improve the art of xerography by improving powder cloud generators.

It is another object of this invention to provide new means and methods for creating aerosols of powder in gas.

An objective in the art of xerography, as in any art concerned with image reproductions, is that of uniformly developing high quality copy. Means of obtaining this objective in xerography while using powder cloud development is through the uniform and constant presentation to the electrostatic latent image on a plate surface of a powder cloud of fine developer powder particles uniformly and densely deposited throughout.

This invention attempts to attain the objective of creating uniform and dense powder clouds through the metering of powder particles at a uniform rate to a gas stream. This is accomplished by uniformly loading a membrane and uniformly dispensing the powder particles loaded into and onto the membrane in the form of a powder cloud. In this invention, the membrane is a porous membrane and is shaped into an endless belt. The belt is positioned over two wheels. The two wheels and the belt are enclosed in a housing, and one wheel is positioned at the base of the housing and covered with developer powder particles. The other wheel is not immersed in the supply of powder particles. A stream of gas is fed into the housing, and the belt is moved so that portions of the belt having passed through the powder reservoir at the base of the housing are next led to or passed over an output tube. As the belt passes through the powder, it picks up powder particles. These powder particles are blown off the belt as the belt passes the output tube.

It is, therefore, an object of this invention to improve upon powder cloud generators so that a uniform and dense dispersion of powder particles in gas is created.

It is another object of this invention to improve upon means and methods of creating uniform and dense dispersions of particles of powder in gas.

For a better understanding of this invention, together with other further objects thereof, reference is now had to the following description taken in connection with the accompanying drawings, and the scope of the invention will be pointed out in the appended claims.

Figure 1:
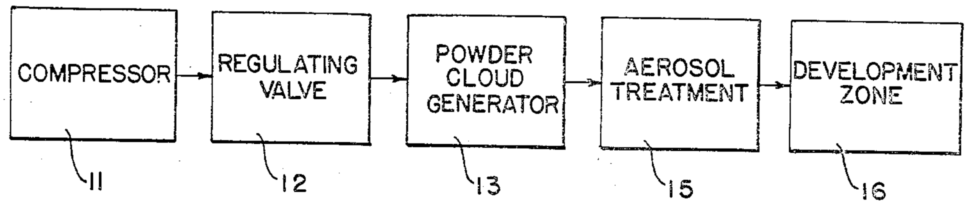
Fig. 1 is a block diagram of elements which would generally appear in xerographic cloud-creating apparatus for use in developing electrostatic latent images.

Referring now with more particularity to the drawings, in Fig. 1 is shown a block diagram of elements which compose cloud-creating apparatus for development of electrostatic latent images. As is indicated in this diagram, compressed air is fed from compressor 11 to a powder cloud generator 13 through a regulating valve 12, and the output of the powder cloud generator is fed through aerosol treatment zone or block 15 and then to the development zone 16 whereat electrostatically-charged developer particles are passed for development purposes to a surface carrying an electrostatic latent image.

The source of compressed or pressurized gas may be any suitable source, such as, for example, an air pump or like pressure-generating member or a suitable pressurized gas container. Such containers are readily available on the commercial market in the form of gas capsules of carbon dioxide or the like under pressure, in the forms of bombs or the like of gas such as fluoror-chloroalkanes, which are available under the general family name of "Freon." Similarly, a suitable system may comprise a pump or generating means optionally in combination with a pressure chamber whereby fluctuations in pressure may be limited or avoided.

Regulating valve 12 is used to control the rate of flow of gas from compressor 11 to powder cloud generator 13 and also to control the pressure of gas supplied to the powder cloud generator.

The powder cloud generator, which is the next block in this diagram following regulating valve 12, is used to create an aerosol of powder in gas. It may be supplied with powder in what may be termed the raw or bulk form, that is, powder taken directly from the container and directly supplied in that form without treatment to a powder cloud generator, or it may be supplied with powder which is first treated and then placed in position in the generator. The particular powder used is dependent on a number of factors, such as other elements used in the cloud-generating apparatus, the form of xerographic development, the desired quality of the final copy, and the like. A more detailed discussion of powders will appear below.

The aerosol treatment zone 15 of the diagram appearing in Fig. 1 may represent any number of means and apparatus for imparting an electrostatic charge to the individual powder particles in the aerosol supplied from the powder cloud generator, or may represent any number of means and apparatus for de-agglomerating particles of the aerosol. Charging of particles and deagglomeration may be accomplished by turbulently flowing them through fine capillary tubes, or charging may be accomplished by passing the aerosol of powder in air through a corona discharge zone, or the like.

The aerosol is next supplied, as indicated by the block diagram, to development zone 16. Generally, this zone includes a means for expanding the aerosol to a cloud, and optionally, this may be done by leading the air from tubes or the like to a larger area where the aerosol expands, creating the cloud of developer particles in gas. It is also feasible and sometimes desirable to use the particles in aerosol form without expansion.

In xerography, in order to develop a true copy of the original image, it is generally desirable to develop against gravitational pull, in that the electrostatic charges on the plate surface truly represent the pattern of the image projected to the plate surface, and allowing gravitational forces to operate in the deposition of developer particles may result in a distorted reproduction. One way of avoiding effects of such forces is through the positioning of the plate with the image bearing surface facing downward and creating a cloud beneath it. In some instances particles deposited because of other forces are removed during the development process through the use of such techniques as directing slight air currents or winds to the plate surface. Such winds or currents should be sufficient to remove particles not held in place due to electrostatic forces, but should be limited so that particles electrostatically held in place are not affected.

It is to be understood that many modifications may be made in the apparatus described in connection with the block diagram shown in Fig. 1. For example, a device may be inserted between the powder cloud generator and the aerosol treatment block for purposes of further de-agglomerating clumps of particles fed in the aerosol from the powder cloud generator. A device may also be inserted between the powder cloud generator and the aerosol treatment block for purposes of dehumidifying the developer powder particles. Such a device may also be inserted between the treatment block and the development zone block. These modifications have been included herein for purposes of demonstrating that the powder-cloud-creating device shown and described in connection with Fig. 1 is for illustrative purposes and is intended to include within its scope modifications and equivalents able to accomplish the purpose of generating a powder cloud for deposition on electric charge patterns. It is to be understood, of course, that other uses may also be made of the generated aerosol.

Figure 2:
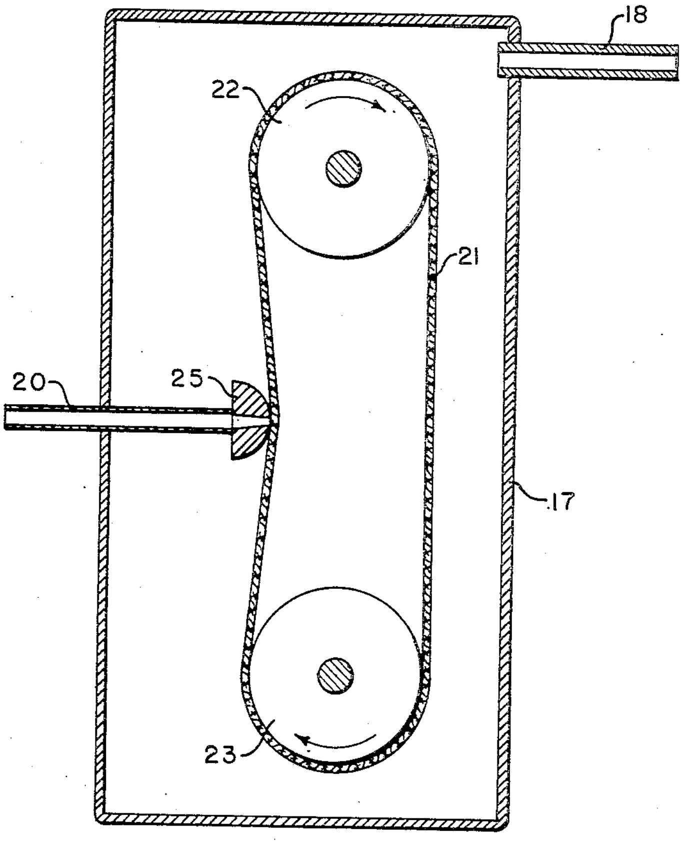
Fig. 2 is a side view in cross section of one embodiment of a powder cloud generator contemplated by this invention.

Reference is now had to Fig. 2 wherein is shown a simple embodiment of a powder cloud generator according to this invention. A housing 17 having an input tube 18 and an output tube 20 encloses the elements of the generator. Within housing 17 is positioned endless belt 21 over wheels 22 and 23. Wheel 22 is connected to a motor (not shown in this figure) and the motor in driving wheel 22 causes movement of belt 21. Wheel 23 is a freely-rotating wheel and acts to guide and position belt 21 as it moves when the motor is operating. One end of output tube 20 is positioned within housing 17 and is fitted with a smooth cylindrical fitting 25. Fitting 25 is positioned within the normal path of movement of belt 21 and thereby assures close contact between belt 21 and the opening in output tube 20 as belt 21 passes over the open end of output tube 20 within housing 17. Fitting 25 should have a smooth surface to allow belt 21 to freely move across it while keeping wear and tear on belt 21 to a minimum. Fitting 25 may be composed of any material having a smooth finish, such as glass, metals, plastics, fibrous materials and the like.

Belt 21 should be composed of a material which will load with powder as it passes through a supply of developer powder. In the apparatus shown in this figure, a supply of developer powder may be placed at the base of the device to a point where wheel 23 is covered, and belt 21, when activated, would move through the powder supply and then over fitting 25 surrounding the exit of output tube 20.

During operation, gas is flowed through input tube 18 and into housing 17. The only exit from the housing or means of escape for the gas is through output tube 20. For the gas to escape or pass through output tube 20, it must pass through belt 21 positioned over the opening of the output tube. The belt, on moving through the powder reservoir when the apparatus is loaded for operation becomes loaded with powder particles. The particles loaded to the belt are then carried to the exit or opening of output tube 20 and thereat load the gas escaping from housing 17 through output tube 20 with powder particles, creating at the output end of output tube 20 a mixture of powder particles in gas.

The housing 17 should be composed of any material able to withstand air pressures and should be formed to be air-tight. A brass housing similar to the one illustrated in Fig. 2 has been constructed and has worked well. However, it is to be realized that plastics may be formed into the desired shape and would work well, and in effect, any material which may be subjected to pressures and which can be made air-tight will work and all such materials are intended to be encompassed by this invention.

Figure 3:
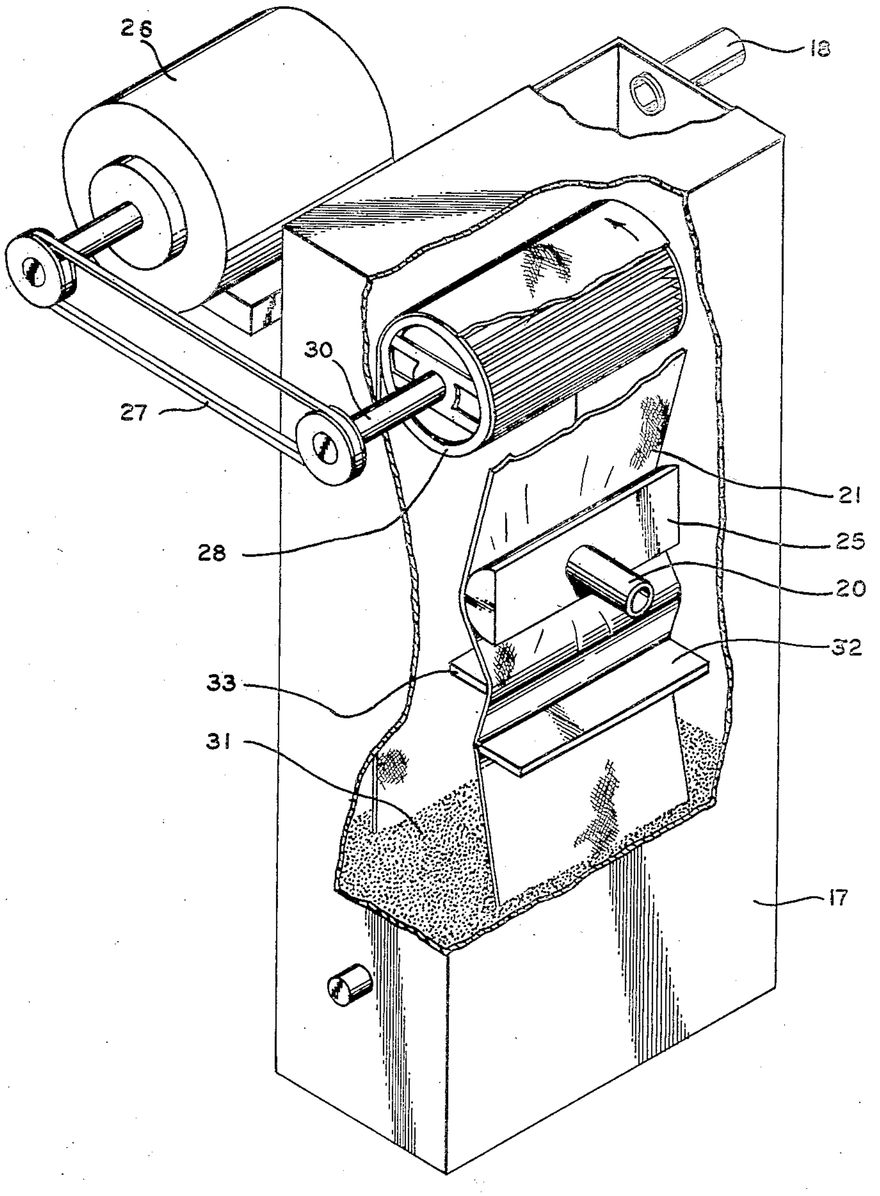
Fig. 3 is an isometric drawing of another embodiment of a powder cloud generator according to this invention.

Reference is now had to Fig. 3 wherein is shown another embodiment of a powder cloud generator according to this invention. In this figure, the housing is again designated 17, the output tube 20, the belt 21, the input tube 18, and the cylindrical fitting 25. In this figure a drive means is shown, as for example motor 26, driving drive-belt 27 to cause rotation of wheel 28 through axle 30. Also shown in this figure is a supply of developer powder particles 31 at the base of housing 17. The lower wheel in this embodiment does not appear in the drawing, in that with the supply of developer powder particles 31 in the device, the wheel is totally covered with developer powder. The upper wheel 28 is similar to the lower wheel and is one type of wheel intended to be encompassed by this invention. The wheel 28 is intended to represent a wheel formed along squirrel-cage lines. Such a wheel has flat discs at each end which may be entirely closed or partially opened, and are shown partially opened in this embodiment. The flat discs are supported and held in position by parallel bars adjoining the edges of the two discs. Although in this embodiment the wheels are separated by parallel bars, there is no intention to limit the wheels to such construction. The intent and purpose is simply to devise a porous type of wheel, one which will allow powder particles to travel through it, and such a purpose is attained through the use of parallel bars or cross bars or a screen separating the disc ends, or the like. Such forms of porous wheel construction are intended to be encompassed by this invention. This type of wheel has its real value at the particular end of the powder cloud generator in which the powder reserve or powder reservoir is positioned. Such a wheel allows powder particles to travel through the wheel itself, thereby bringing about loading with powder particles of the inner loop of belt 21 in addition to the loading of the outer side by the reservoir. Such a wheel also acts to tumble and stir up powder particles in that area of powder reservoir 31 to facilitate loading of powder particles to belt 21. The benefit of using the same type of construction for both wheels is so that either end of the device may be the end in which the powder reservoir is positioned or stored. Although it is preferred that loaded portions of the belt pass from the loading area to the output exit or into contact with fitting 25, it is to be realized that a mixture of powder particles in gas valuable in xerography may be created even though loaded areas of the belt pass over the other wheel before coming into the area of the output exit. Also, it is to be realized that a reversible motor could be used to cause rotation of wheel 28 in whatever direction is desired, depending on which wheel is covered by powder reservoir 31.

Shown also in this embodiment are scraper blades 32 and 33. These blades are desirably positioned in the path of movement of belt 21 next following movement through powder reservoir 31 and prior to movement over fitting 25. Scraper blades 32 and 33 remove excess powder particles loaded to belt 21 from powder reservoir 31. This is accomplished in this embodiment by positioning scraper blades 32 and 33 to warp the path of travel of belt 21 by impinging on its normal path of travel. In removing excess powder the blades remove powder loaded above the belt surface, and in so doing they remove that powder which is most likely to vary in amount from point to point along the belt.

The particular powder particles which are generally used in the xerographic art for the development of electrostatic xerographic images and the like are such that they tend to adhere to one another and draw one another upon themselves. Using such particles, it is usual for a belt of material to pass through a supply of powder particles and draw with it on its surface varying amounts of excess particles. Scraper blades 32 and 33 tend to remove excess particles drawn along with the belt and also tend to impregnate into the belt material powder particles positioned on the surface of the belt following passage through powder reservoir 31. The removal of the excess particles tends to assure consistency and uniformity in output of powder particles in gas from the output end of output tube 20 by preventing excess particles and particles not loaded into the material itself from reaching the area of fitting 25. The impregnation of particles into the material tends to create a de-agglomerated aerosol of powder particles. It is to be understood that scraper blades 32 and 33 are here included for illustrative purposes and that any device or mechanism able to accomplish the same end objectives is intended to be encompassed by this invention.

It is to be realized that if a generator of an aerosol of powder particles is to be constructed similar to the embodiment shown in Fig. 3 which is intended to operate having one particular wheel within the powder reserve or reservoir at all times, the upper wheel in this figure designated 28 may be a friction drive type of wheel. Such a friction wheel may comprise a solid wheel having a roughened surface to provide drive to belt 21 when motor 26 is operating.

Figure 4:
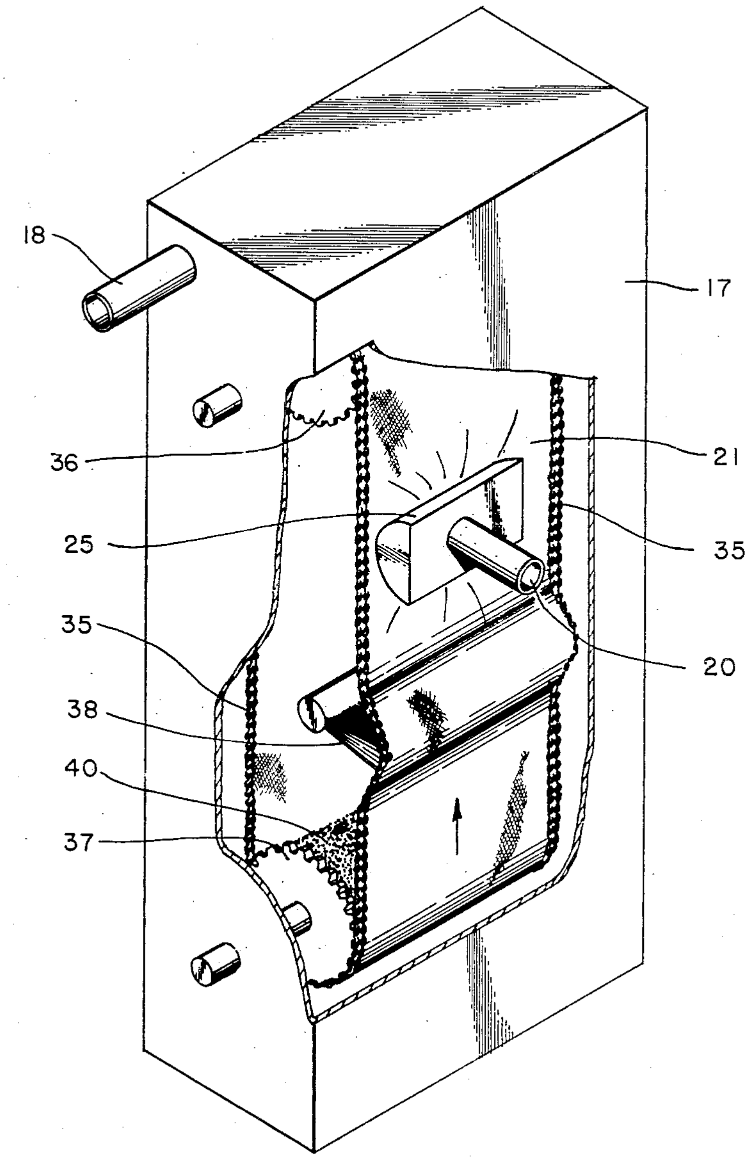
Fig. 4 is an isometric drawing of yet another embodiment of a powder cloud generator according to this invention.

Reference is now had to Fig. 4 wherein is shown another embodiment of a powder cloud generator according to this invention. In this figure, as in Figs. 2 and 3, the housing is designated 17, the output tube 20, the input tube 18, and the belt 21. The belt in this embodiment is attached at its edges to chains 35. The wheels designated 36 and 37 are each formed of two sprocket wheels separated and positioned by an axle. The sprockets of sprocket wheels 36 and 37 engage in the links of chains 35. A motor (not shown in this figure) drives for example wheel 37 causing movement of belt 21 as sprockets of wheel 37 engage and drive links of chains 35. Wheel 36 is for purposes of guiding belt 21 through a predetermined path and also for purposes of holding the belt taut while in movement through its path. A brush 38 is positioned to contact and brush the inner side of belt 21. Brush 38 acts similar to scrapers 32 and 33 shown and described in connection with Fig. 3. It removes excess powder particles loaded to the belt and impregnates particles into the belt material. In this embodiment of the invention, a supply of developer powder particles 40 is positioned within wheel 36, and the powder particles tumble against the inner surface of belt 21 as belt 21 moves around wheel 36 thereby loading its inner surface with powder particles.

This embodiment differs from those shown in Figs. 2 and 3 in that the device shown in Fig. 4 loads and impregnates only the inner side of belt 21, whereas, in the other embodiments of this invention, both the inner and outer sides of belt 21 are loaded as the belt passes through a powder reservoir in the base of the device. It is to be realized, of course, that powder may also be positioned to contact the outer surface of belt 21 in this figure as was done in connection with the embodiments of Figs. 2 and 3. It is noted, however, that powder loading of only the inner surface, as is accomplished in the device illustrated in Fig. 4, has some advantages over powder loading of both surfaces. With continuous use of the apparatus illustrated in Fig. 3, there is a tendency for the amount of powder particles produced in gas in the output end of output tube 20 to decrease slightly. It is believed that this decrease takes place because of the tendency of the powder particles making contact with the outer side of belt 21 to cake at a slight distance from the path of movement of belt 21. In effect, it is believed that particles in contact are removed from the powder reservoir by belt 21 and then a tunnel in the powder reservoir tends to form, leaving a space between the outer surface of belt 21 and the supply of powder particles. This vacant area or tunnel does not refill efficiently with other particles in the area. However, it is to be realized that means may be incorporated in the apparatus to prevent tunneling such as vibrating the device and the like. Yet, caking and tunneling in powder reservoir 31 tends to decrease loading of powder particles to the outer surface of belt 21. Removing particles from the base generally of the housing and limiting their contact only to the inner loop, brought about by tumbling as the belt is moved, produces a more constant output over time. It is to be realized, however, that for many applications in the art of xerography the slight variances produced using powder on both sides of belt 21 are not detrimental to the xerographic process, and loading powder cloud generators according to this invention, either as shown in Fig. 2 and Fig. 3 or Fig. 4, is presently considered valuable to the art of xerography.

A further beneficial feature of the generator shown in Fig. 4 is the chain drive through sprocket wheels of belt 21. Chains 35 in riding on the sprockets of wheels 36 and 37 remain in their proper position throughout the path of movement and hold belt 21 tautly in place. This type of drive has been found valuable to overcome a problem sometimes encountered with cloth belts. Cloth belts, it has been found, occasionally ride back and forth into different areas over the wheels of devices such as those shown in Figs. 2 and 3. Riding will take place because of the belt material, or because of wheel surfaces, or because of the belt structure, or the like, and such belt movements may be prevented by the use of chains and sprocket wheels as disclosed and discussed in connection with the embodiment shown in Fig. 4 or through the use of other mechanism known to those of the art.

The opening in output tube 20 may vary substantially. It is desirable in each instance to provide an opening which is smaller across the width of belt 21 than the width of belt 21. A smaller opening or exit across the belt width in the output tube assures no leakage of gas around the belt edges thereby assuring full effect of the gas rushing out the exit opening of output tube 20 on powder particles carried by belt 21. An example of a proper exit opening in output tube 20 would be a ⅛ of an inch diameter circular opening when a ⅜ of an inch wide belt is being used, or a 2-inch or 2¼-inch slot type of opening using a 2½-inch wide belt. The opening itself may be circular, slotted, or may have other shapes and forms.

The belt material should be any porous material when using an output arrangement requiring the gas to pass through the material to reach the output tube. A study has been made of various cloth and cloth-like materials which could be used as material for the endless belt. This study appears in Table I. The technique used in arriving at powder-laden samples to find the data for this table was that of tumbling the powder over the material and scraping off the excess powder with a blade, or it may be said the technique is similar to that used in the generator shown in Fig. 4. It is to be realized, however, that the data shown in this table are also indicative of the value of the material when used for belts in embodiments such as those shown in Figs. 2 and 3.

*Table I*

| Material | Amount of powder held, gm./sq. in. | Material | Amount of powder held, gm./sq. in. |
|---|---|---|---|
| Velveteen | 0.062 | Wool jersey | 0.013 |
| Woolen coating | 0.042 | Filter paper, Whatman No. 1. | 0.011 |
| Napped rayon lining | 0.040 | Mercerized cotton | 0.016 |
| Cotton flannel | 0.030 | Novelty weave wool | 0.007 |
| Cotton terry cloth | 0.025 | Cotton broadcloth | 0.006 |
| Miracloth | 0.015 | | |

This table indicates that materials having considerable nap are most effective in holding powder. It is to be understood that the materials listed in Table I are only a sample of materials which could be used to act as belt material for powder cloud generators being discussed herein. Any material capable of accepting and holding powder particles as it moves through a supply of powder particles and able to allow powder to move through it or from it through an output tube is intended to be encompassed within the scope of this invention. One other such material not listed which has been tried in connection with the embodiment shown and described in connection with Fig. 3 is a hundred mesh brass screen formed into the shape of an endless belt. Such a belt would have better wearing qualities than cloth. However, it was found that the belt would not pick up sufficient powder in a uniform amount. When the mesh wire belt is coated with a layer of silicone oil, it will pick up powder uniformly and in sufficient quantities, and it is presently believed that almost any material which will allow powder to lodge within it or on it and which will allow the lodged powder to be blown from it is valuable as belt material for the generators disclosed herein. Some materials may need pretreatment, such as the brass screen disclosed above, yet it is presently believed that all such materials may be made to work and are valuable belt materials within the scope of this invention.

The particular materials which have been found to work best as belt material are cottons, either in the form of cotton flannel or the equivalent such as cotton bias or hard cotton materials having a nap produced thereon by rubbing the material with a wire brush or the like. These materials give preferred performance even though they do not hold as much powder as some other materials.

Experiments have been conducted to examine the relation of powder delivered out the output tube using different air pressures in the chamber. The delivery rate of powder increased with increasing air pressure in the chamber, until, using a constant belt speed, the pressure reached a point beyond which no increase was noted. It is presently believed that at that point all of the powder is being blown from the belt and, therefore, further increases in powder output should not appear.

An examination of the relationship between the quantity of powder delivered from the output tube as it relates or is controlled by belt speeds has also been made. It has been found using a fixed housing pressure, that somewhat of a direct relationship exists between the quantity of powder delivered and the speed of the belt. As the belt speed increases the powder output also increases; however, when the belt linear speed is very high, the rate at which powder is delivered out the output tube does not continue to increase with increases in belt speed. It is presently believed that at high speeds a point is reached above which each portion of the belt does not continue to pick up as much powder as each portion did below that point.

The blades used to remove excess particles and discussed in connection with the embodiment shown in Fig. 3 may be any form of material such as metal, glass, plastic and the like, and are desirably shaped with a somewhat rounded edge contacting the belt material. It is desirable to have some sharpness in the blade so that excess particles will easily fall off the belt, yet it is also desirable to have a smooth edge on the blade to prevent excess wear and tear on the belt material. It is to be realized, of course, that bristle brush scrapers may also be used instead of the blades as shown in Fig. 3. Such a scraper is used and illustrated in connection with the embodiment shown in Fig. 4. The bristles of a scraper to remove excess particles such as scraped brush 38 shown in Fig. 4, should be within the range of medium stiffness to medium soft bristles. Using a stiff bristle brush, the cloth will tend to wear too fast, whereas with a soft bristle brush less wear and tear on the belt material will result. A stiff brush will be most effective in removing excess particles and in impregnating the belt, whereas a soft brush will be somewhat inefficient. The suggested bristle range is a compromise resulting in good removal of excess particles, good impregnation, and yet not too much wear on the belt materials.

Belt widths may vary substantially. Generally it may be said that the wider the width used, the denser the aerosol produced, and the narrower the width used, the thinner the aerosol produced. Typical widths which have been used include ⅜ of an inch, 2½ inches and the like, and it is presently believed that any width belt may be used. It is to be realized, of course, that the housing in each instance must be large enough to accommodate the belt and that the output orifice may need modification in order to effectively remove the loaded particles from the belt carried over the exit area of the output tube. Further, it is pointed out that when using wide belts, more than one output tube may be used, and the outputs from the output tubes in such an instance may be combined for use together or may be used separately for one or different purposes. When using very wide belts, it is desirable to provide means to guide, position and hold taut the belt material. This may be accomplished for example by adding additional chains such as those shown in Fig. 4 and additional sprocket wheels for the chains to ride on throughout the width of the belt material and throughout its path of travel.

Although the embodiments illustrated show two wheels or the like, it is to be realized that it is not intended to so limit this invention. The objective in using two wheels to move the belt through a predetermined path may also be attained through other means. For example, one wheel only may be used disirably having a hollow rim so that the belt may load with particles when it passes through the supply of particles or so that the inner area of the wheel alone may be loaded with particles for tumble loading of the belt as was discussed in connection with the embodiment shown in Fig. 4. Using a single wheel, the belt desirably should fit the wheel as a tire fits a rim.

From the point of view of composition of the developer particles prints or pictures may be produced with charcoal, carbon blocks or carbonaceous pigments. Under proper conditions, any of a number of various carbon or lamp black materials may be employed, including such material as furnace blacks, channel blacks and the like. In addition, there may be used such material as milled charcoals and similar materials, or, if desired, finely divided materials having added pigment matter. In the latter category are materials such as finely divided resins containing pigments or dyes such as carbonaceous pigments or various coloring pigments and the like, compositions of this type being preferred where the print or picture ultimately is to be made permanent by a fusing process including heat or vapor fusing.

It is to be realized that varying outputs from powder cloud generators according to this invention are of value in the art of xerography. For example, using the embodiment shown in Fig. 3, with a belt ⅜ of an inch wide made of cotton bias tape, with an exit orifice in the output tube which is circular in shape with a diameter of ⅜ of an inch, with the belt moving at a linear speed of approximately 2,000 inches per minute, with known xerographic developer powder particles having a size range of from 1 to 20 microns with most of the particles being from 2 to 10 microns in size, while passing approximately 10 liters of air per minute through the housing, an output of 75 micrograms of powder per cubic centimeter of aerosol will be produced. For the particle size being used, this is roughly equivalent to $10^6$ particles per cubic centimeter per cloud, and such an output may be used to develop or make visible normal line copy or printed matter in electrostatic charge formation on a surface at the rate of approximately a 1″ x 4″ strip in five seconds. It is pointed out that the powder density of the output may be increased by increasing tape width, by increasing the pressures in the housing, by increasing the air flow, by increasing the linear speed of the tape, and the like, and that with denser outputs, less time would be needed for the development of xerographic charge patterns. It is also pointed out that the output may be decreased by decreasing the linear speed of the tape or belt, by decreasing pressure in the housing, by decreasing the width of the belt and the size of the exit opening, by decreasing air flow, and the like, and more time would be required for proper development. Great variations are possible in output and such variations are intended to be encompassed by this invention.

It is noted that the apparatus and method of this invention allows for continuous operation. Disruption of operation is only necessitated due to depletion of the developer supply and automatic means may be provided to keep the supply within the housing constant.

It is also to be realized that varying uses may be made of generators according to this invention. For example, in developing xerographic images, this invention may be used to make visible line copy, half tones, and continuous tones.

While the present invention as to its objects and advantages, as has been described herein, has been carried out in specific embodiments thereof, it is not desired to be limited thereby, but is intended to cover the invention broadly within the spirit and scope of the appended claims.

What is claimed is:

1. A generator of an aerosol of powder particles for development of xerographic images comprising a gastight housing, an input tube extending into said housing, an output tube having an internal opening within the housing and an external opening extending outside said housing, said input tube being adapted to supply a flow of gas to said housing from a gas source at a sufficient pressure to form an aerosol of powder particles at the internal opening of the output tube and said output tube being adapted to feed an aerosol of powder particles from said housing, an endless belt of material positioned and disposed in said housing adapted to hold powder particles releasable to gas flow through said belt, means to drive the belt at a uniform rate of speed to move the belt through a path of travel including a supply of solid developer powder in the bottom of the housing and thence over the internal opening of the output tube, and means within said housing to substantially uniformly impregnate and load said belt with powder particles in the path of travel of said belt prior to movement over the internal opening of the output tube, said input tube being positioned and disposed relative to said belt and its path of travel and relative to said output tube to feed gas fed into said input tube first into said housing and then through the portion of the belt material over the internal opening of the output tube then out said output tube.

2. Apparatus according to claim 1 in which said means to substantially uniformly impregnate and load said belt with powder particles includes means to remove excess particles from portions of the belt prior to movement of said portions over the internal opening of the output tube.

3. A generator of an aerosol of powder particles for development of xerographic images comprising a supply of pressurized gas, an airtight housing, an input tube adapted to supply a flow of gas to said housing from said supply of pressurized gas, drive and guide means, an endless belt of napped material in said housing positioned and disposed on said drive and guide means, a motor to drive said drive and guide means to cause movement of said belt, a supply of xerographic developer powder particles positioned and disposed at the bottom and within said housing, said drive and guide means being adapted to guide said belt through a path including through said supply of xerographic developer powder particles in said housing, means in said housing to remove excess powder particles loaded above the surface of said belt positioned next in the path of said belt following movement through said supply of xerographic developer powder particles, and an output tube having an internal opening within said housing and an external opening extending out of said housing and adapted to supply out of said housing an aerosol of powder particles, said drive and guide means being adapted to guide said belt through its path of travel next over and in contact with said internal opening of said output tube following movement by said means to remove excess powder and said input tube being positioned and disposed relative to said belt on said guide and drive means to feed gas into said housing and next through portions of said belt positioned over said internal opening of said output tube and then out said output tube.

References Cited in the file of this patent

UNITED STATES PATENTS

| | | |
|---|---|---|
| 906,176 | Westbrook | Dec. 8, 1908 |
| 1,283,071 | Cooper | Oct. 29, 1918 |
| 1,319,377 | Cooper | Oct. 21, 1919 |
| 2,210,470 | Sterling | Aug. 6, 1940 |
| 2,416,695 | Jessop et al. | Mar. 4, 1947 |
| 2,506,203 | Forrest | May 2, 1950 |
| 2,614,655 | Katz | Oct. 21, 1952 |
| 2,639,543 | Abler | May 26, 1953 |
| 2,664,226 | Gobin | Dec. 29, 1953 |
| 2,684,902 | Mayo et al. | July 27, 1954 |
| 2,716,826 | Huebner | Sept. 6, 1955 |
| 2,718,987 | Kimball | Sept. 27, 1955 |
| 2,725,304 | Landrigan et al. | Nov. 29, 1955 |
| 2,756,676 | Steinhilper | July 31, 1956 |
| 2,761,416 | Carlson | Sept. 4, 1956 |

FOREIGN PATENTS

| | | |
|---|---|---|
| 515 | Great Britain | of 1869 |